United States Patent [19]

Urech et al.

[11] Patent Number: 4,844,803

[45] Date of Patent: Jul. 4, 1989

[54] FILTER PRESS WITH A PLURALITY OF MEMBRANE FILTER PLATES

[75] Inventors: Rolf Urech, Münchenstein, Switzerland; Ludwig Mayer, Aitrach, Fed. Rep. of Germany

[73] Assignee: Lenser Verwaltungs-GmbH, Senden, Fed. Rep. of Germany

[21] Appl. No.: 149,742

[22] Filed: Jan. 29, 1988

[30] Foreign Application Priority Data

Jan. 29, 1987 [CH] Switzerland ............................ 299/87
May 14, 1987 [EP] European Pat. Off. ........... 87106987

[51] Int. Cl.$^4$ ...................... B01D 25/32; B01D 25/12; B30B 15/14
[52] U.S. Cl. .................... 210/225; 210/227; 210/230; 210/231; 100/53; 100/194; 100/115
[58] Field of Search ............... 210/224, 225, 226, 227, 210/228, 229, 230, 231, 232; 100/53, 115, 194, 206

[56] References Cited

U.S. PATENT DOCUMENTS

| | | | |
|---|---|---|---|
| 3,270,887 | 9/1966 | Juhasz et al. | 210/230 |
| 3,926,811 | 12/1975 | Ramsteck | 210/231 |
| 4,317,734 | 3/1982 | Kurita | 210/227 |
| 4,329,228 | 5/1982 | Crowe et al. | 210/230 |
| 4,565,637 | 1/1986 | Pearce | 210/231 |
| 4,617,863 | 10/1986 | Kenyon | 210/227 |
| 4,666,596 | 5/1987 | Oelbermann et al. | 210/231 |
| 4,746,428 | 5/1988 | Junker et al. | 210/230 |

FOREIGN PATENT DOCUMENTS

| | | | |
|---|---|---|---|
| 212695 | 8/1984 | Fed. Rep. of Germany | 100/53 |
| 75003108 | 1/1975 | France | 100/53 |

Primary Examiner—Richard V. Fisher
Assistant Examiner—Cynthia L. Nessler
Attorney, Agent, or Firm—Herbert Dubno

[57] ABSTRACT

A housing block with a first passage and a second passage extending parallel to the first passage is attached to each membrane filter plate. A piston is mounted slidably in the first passage and a spacing bolt is positioned slidably in the second passage. A first circumferential groove which is connected with a compression compartment between elastic membranes extending radially exteriorly is introduced into the center of the first passage. The piston has a plurality of, advantageously four, axially extending piston grooves which connect with the circumferential groove in the open configuration and because of that the above mentioned compression compartment is connected with the surrounding atmosphere. The operation of the pistons is positively actuated by a counterweight and the sealing bolts are positioned in succession in a row. The motion of these spacing bolts is bounded by a stop piece. In the described filter press each compression compartment is associated with a valve including the piston which allows the safe and rapid relief of the pressurized medium located in the compression compartment depending on the press force exerted on the membrane filter plate.

20 Claims, 8 Drawing Sheets

FILTER PRESS WITH A PLURALITY OF MEMBRANE FILTER PLATES

FIELD OF THE INVENTION

Our present invention relates to a filter press with a plurality of membrane filter plates.

BACKGROUND OF THE INVENTION

A filter press can comprise a plurality of membrane filter plates which are positioned slidably between a locally fixed head piece and a press plate, a hydraulic device for pressing together the membrane filter plates between the head piece and the press plate and a device for feeding a pressurized gaseous medium under pressure to a plurality of membranes of the membrane filter plates.

In the known membrane filter plates the filter cake is prematurely broken away to press the solid cake material already built up mechanically with the aid of suitable member filter plates. In this known way the desired solid content in the filter cake is attained with the appropriate sludge or waste in an economical way.

The known membrane filter plates are equipped with one or two movable membranes which are acted on by pressurized air or another gaseous medium. The apparatus operates with a gas pressure between 4 to 16 bar.

The filter plate size and the pressure to which the membranes are subject determine the requisite gas volume for the mechanical pressing out of the filter cakes.

The press components of the filter press must withstand an increased load during the mechanical pressing, i.e. an equivalent closing force must be produced reliably and repeatably. A relaxation of the closing force of the filter press during the time in which the membranes are acted on by the gas pressure can result in catastrophic consequences. Although electrical controls with corresponding safety circuits are provided a sealing element in the hydraulic plant can fail and unseal, a pressurized pipe can break or a hydraulic hose can burst. Even when a pressure relief valve is provided in the feed pipe of the pressurized medium it is not in a position to relieve the compressed gas volume in a reasonable time interval.

OBJECTS OF THE INVENTION

It is an object of our invention to provide an improved filter press with a plurality of membrane filter plates which will obviate drawbacks of earlier systems.

It is also an object of our invention to provide an improved filter press with a plurality of membrane filter plates in which the compressed gas volume can be relieved or decompressed safely in the shortest possible time span before damage occurs.

SUMMARY OF THE INVENTION

These objects and others which will become more readily apparent hereinafter are attained in accordance with our invention in a filter press comprising a plurality of membrane filter plates which are positioned slidably between a locally fixed head piece and a press plate, a hydraulic device for pressing together the membrane filter plates between the head piece and the press plate and a device for feeding a pressurized gaseous medium under pressure to a plurality of membranes of the membrane filter plates.

According to our invention, the filter press further comprises a relief device to rapidly decompress and vent the pressurized gaseous medium in the membrane filter plates and having a plurality of valves. The relief device has means for automatically closing the valves when the membrane filter plates are pressed together and for automatically opening the valves when the outer pressure on the membrane filter plates relaxes.

Each membrane filter plate can be associated with one of the valves. Each of the valves can have a piston slidable in a first passage and a piston spring acting on the piston. A first circumferential groove extending radially exteriorly is formed in the first passage which is connected by a connecting passage with a compression compartment between the membranes of the membrane filter plate. At least one axially extending piston groove is formed in the piston by which the pressurized gaseous medium flows to the surrounding atmosphere when the valve is opened.

An additional circumferential groove for receipt of a first sealing ring is formed on each side of the first circumferential groove. Each of the pistons has an axial first blind hole. An interior thread is formed at least in the end portion of the first blind hole facing away from the axially extending piston groove.

A positioning screw with a flat head is screwed in the first blind hole for adjustment of the extent or length of the piston and the flat head acts as a support for the valve spring.

The means for opening and closing the valves can include a plurality of spacing bolts, a counterweight pivotable about an axis and a stop piece. Each of the spacing bolts can be slidably mounted in a second passage and can have an interior thread in which a justifying screw for adjustment of the length or extent of the spacing bolts is screwed.

The pistons can be arranged in a row along a first linear path, the spacing bolts and the stop pieces can be positioned along a second linear path parallel to the first linear path, the axis about which the counterweight can be pivotable is attached either to the head piece or the press plate and the stop piece is attached either on the press plate or on the head piece.

Advantageously each of the pistons is slidably mounted in the first passage in one of a plurality of housing blocks and each of the spacing bolts is slidably mounted in the second passage in one of the housing blocks and one of the housing blocks is mounted on one of the small sides and in a corner region of each of the membrane filter plates. A circular recess can be provided in the surface of the housing block contacting on the small side of the membrane filter plate. A second sealing ring is positioned in the edge region of the recess. The interior of the recess is connected on the one side with the first circumferential groove by at least one connecting passage in the housing block and on the other side with the compression compartment between the membranes of the membrane filter plate by a second blind hole in the edge region of the associated membrane filter plate.

Each of the membrane filter plates can have the valve mounted in a housing block closed on one edge whose valve disk is mounted on a piston axially slidable in the closing direction of the filter press and which in the closed state closes with a valve disk front surface facing away from a sealing surface thereof approximately flush with one of the lateral surfaces of the housing block.

At least one passage extending substantially in the axial direction of the piston opens onto the surface of the valve seat which is connected to the connecting passage extending transversely to the piston and with the compression chamber between the membranes of the membrane filter plate.

A spacing bolt is movable and fixable in the axial direction of the piston on the other lateral surface of the housing block opposite the valve disk. The outer positioning surface of the spacing bolt engages the valve disk of the adjacent one of the membrane filter plates and holds the valve closed under the press pressure of the filter press.

The spacing bolt can be provided on an outer surface thereof with an exterior thread for axial positioning which engages in a corresponding interior thread in the housing block and a circular groove can be provided on the outer surface of the spacing bolt having a sealing ring sealing against the housing block.

The piston is provided with a displacement limiting pin oriented transverse to the axis of the piston which bounds the displacement of the piston. Besides the spacing bolt can be provided on a side facing the positioning surface with an axial receiving passage for the piston.

The sealing surface of the valve disk advantageously has a frustoconical shape since the valve disk then is automatically centered in the valve seat under the press pressure of the filter press.

In additional examples of our invention each membrane filter plate has the valve mounted in a housing block closed on one edge which is formed by a substantially cylindrical stopper which is guided axially slidable in a connecting passage extending through the housing block which extends substantially parallel to the plane of the membranes and whose one end is connected with the compression compartment between the membranes and the membrane filter plate while the other end opens into the surroundings.

A spacing bolt can be mounted on each side of the stopper which engages in a guide duct intersecting centrally and at right angles the connecting passage and engages in a wedge shaped cavity of the stopper so that the wedge surface opens on the side facing the membrane filter plate in the outer surface of the stopper and the front surface of spacing bolt contacting on the stopper has inclined sides fitting the wedge shaped cavity.

The outer surface of the stopper between the end of the stopper facing the membrane filter plate and the wedge shaped cavity can advantageously be provided with a circular groove for a sealing ring sealing the stopper against the housing block. The spacing bolt can have a slot extending in the axial direction through which a displacement limiting pin fixed in the housing block engages for limiting the displacement of the spacing bolt and maintaining the spacing bolt in position nonrotatably.

The spacing bolt has a somewhat greater length than the portion of the spacing bolt received in the guide duct so that the front ends of the spacing bolts facing each other in the wedge shaped cavity are engaged by the stopper with the membrane filter plates contacting each other closely. The stopper is provided with a connecting member for a securing chain or the like on an end protruding from the housing block which in the case of a release catches the stopper flying from the housing block due to a sudden pressure drop.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
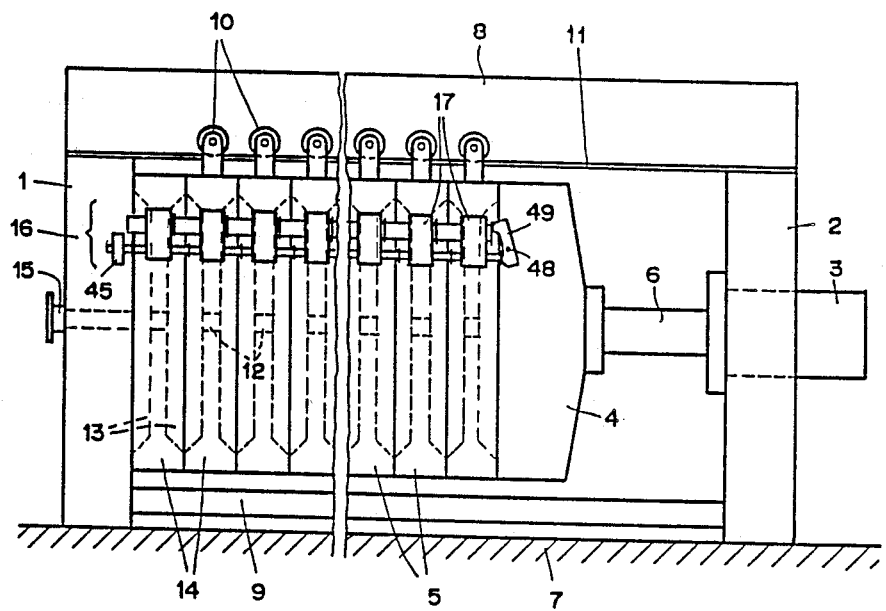
FIG. 1 is a side elevational view of one example of a filter press having a plurality of membrane filter plates according to our invention.

The example of the filter press according to our invention shown in FIG. 1 has a first upright or supporting member acting as head piece 1 and a second supporting member 2 on which a hydraulic device 3 for pressing together the membrane filter plates 5 located between the head piece 1 and a press plate 4 is mounted. The press plate 4 is attached by a piston rod 6 with an unshown hydraulic piston cylinder drive of the hydraulic device 3. The head piece 1 and the second supporting member 2 are attached to the ground or floor 7. The upper end of the head piece 1 and the second supporting member 2 are rigidly attached with each other by a beam 8. For reducing the load on this attachment of the head piece 1 to the supporting member 2 their lower ends are attached to each other by a tie rod 9.

A number, advantageously 50 membrane filter plates 5 are located between the head piece 1 and the press plate 4. Each of the membrane filter plates 5 is slidable along guiding rails 11 by a travelling roller pair 10. Each of the membrane filter plates 5 described further in FIGS. 4 and 5 in more detail has a central opening 12 and a cavity 13 which is surrounded by a widened edge portion 14 of the membrane filter plate 5. The sludge or waste whose solid components are to be filtered out is fed to the filter press through a connector pipe 15 put through the head piece 1.

Figure 2:
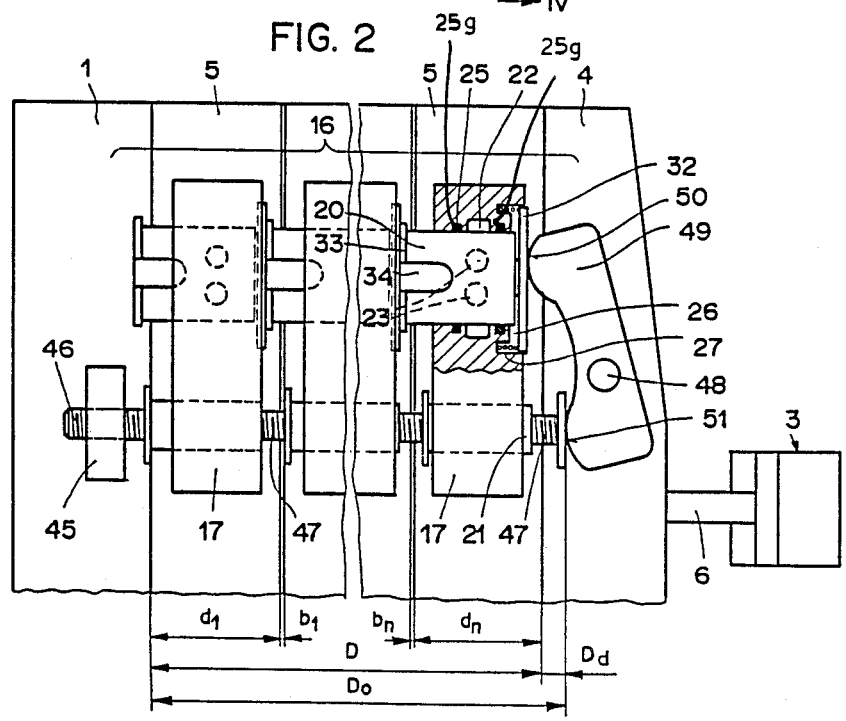
FIG. 2 is a partially broken-away side elevational view, partially cross sectional view of the upper corner portion of the membrane filter plates containing the valves according to our invention in which the valves are shown in the open configuration.

Each membrane filter plate 5 is associated with a portion of a relief device 16 for speeding up the depressurization of a pressurizing medium in a compression compartment 24 in cavity 13 in a way described below. The relief device 16 includes housing blocks 17 each of which is attached to a corner region of each membrane filter plate 5 as seen in FIGS. 2 to 4.

Figure 3:
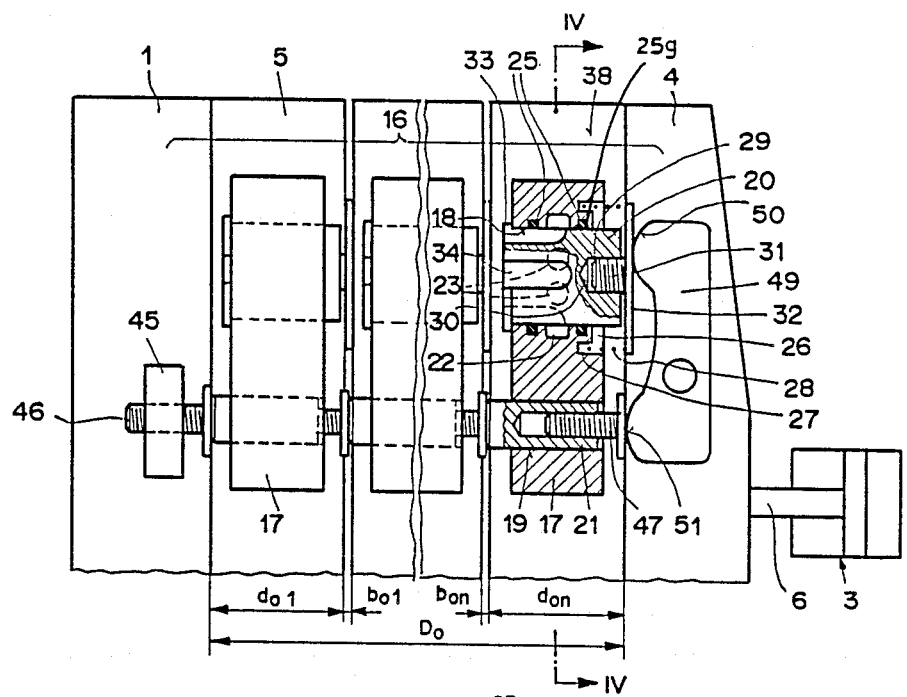
FIG. 3 is a partially broken-away side elevational view, partially cross sectional view similar to FIG. 2 in which the valves are shown in a closed configuration.
Figure 4:
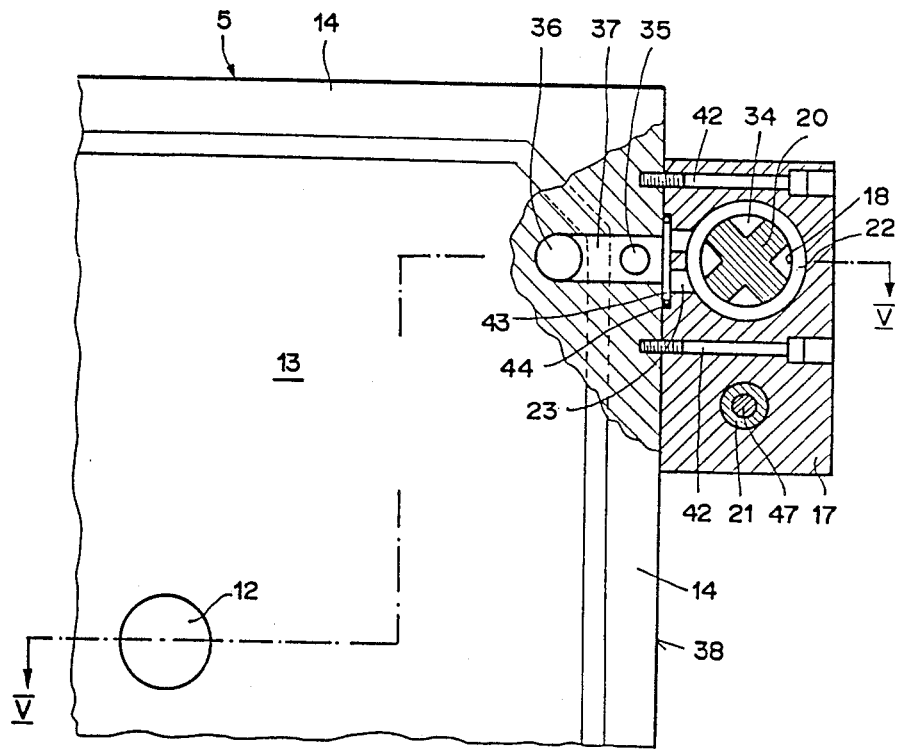
FIG. 4 is a cross sectional view taken along the section line IV—IV of FIG. 3.

In one first example as shown in FIGS. 3 and 4 a first passage 18 and a second passage 19 with a smaller diameter than the first passage 18 are provided in each of the housing blocks 17. A piston 20 is located in the first passage 18 and an axially slidable spacing bolt 21 is located in the second passage 19. A first circumferential groove 22 extending radially exteriorly which is connected with the compression chamber 24 of the membrane filter plate 5 shown in FIG. 5 in a way described as shown below by connection passage 23 extending transversely to the first passage 18. Additional circumferential grooves 25g are provided on either side of the first circumferential groove 22 and receive respective sealings rings 25.

A radial enlargement 26 (FIG. 3) which has a circular axially extending groove 27 is provided in one end of the first passage 18. A compressible spring 28 coaxial to piston 20 is located in this groove 27.

The piston 20 has an axial first blind hole 30 provided with an interior thread 29. A positioning screw 31 with a flat head 32 is screwed into the interior thread 29. The diameter of the flat head 32 is larger than the outer diameter of the compressible spring 28 however smaller than the diameter of the radial enlargement 26. The extent or length of the piston can be adjusted extremely precisely with the aid of the positioning screw 31. A radially protruding edge 33 is formed on the end of the piston 20 opposite the positioning screw 31. Four axially extending piston grooves 34 are present in the outer surface of the piston 20 which extend approximately over half the length of the piston 20. The slidable piston 20 with the axially extending piston grooves 34 in the first passage 18 and the compressible spring 28 together form a valve which in the open state connects the compression compartment 24 of the associated membrane filter plate 5 directly with the surrounding atmosphere so that the compressed medium found in the compression compartment 24 of each membrane filter plate 5 can be depressurized as quickly as possible when it is required.

Figure 5:
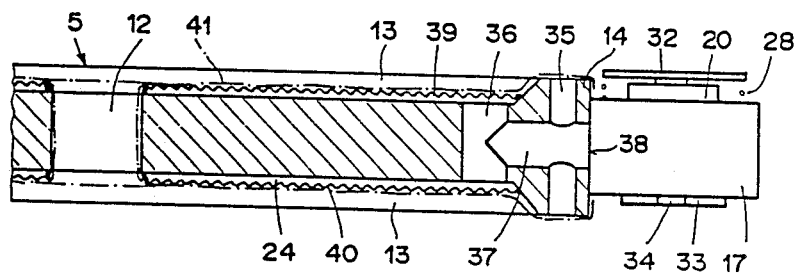
FIG. 5 is a cross sectional view taken along the section line V—V of FIG. 4.

FIGS. 4 and 5 show a corner portion of one of the membrane filter plates 5. In FIG. 5 it is clearly apparent that each membrane filter plate 5 has one of the cavities 13 on each of its opposite sides, a central opening 12 in its center and widened end portions 14 surrounding these cavities 13. A first transverse duct 35 is formed penetrating the edge portion 14 and a second transverse duct 36 is formed connecting portions of the cavities 13 on opposite sides of the membrane filter plate 5. The first transverse duct 35 forms a feed pipe for the compressed medium, e.g. pressurized air, in laterally adjacent filter plates 5. Both transverse ducts 35 and 36 are connected with each other by a second blind hole 37 running perpendicular to them which is provided in a small side 38 of the membrane filter plate 5.

According to FIG. 5 elastic membranes 39 and/or 40 extend between the edge region of the central opening 12 and the junctions between the cavities 13 and the widened edge region 14. The edge regions of the membranes 39 and 40 are sealed air tight with the above named junctions and the edge of the central opening 12 to form the compression compartment 24 so that, when the compressed medium reaches the compression compartment 24 through the first transverse duct 35, the second blind hole 37 and the second transverse duct 36, the elastic membranes 39 and 40 are extended outwardly. A filter cloth 41 which is indicated only with a dot dashed line in FIG. 5 extends around the membranes 39 and 40 and through the central opening 12.

The edge of the filter cloth 41 extends a small distance over the widened edge portion 14 of the membrane filter plate 5.

From FIG. 4 it is apparent that the housing block 17 is attached to the small side 38 of the membrane filter plate 5 by two screws 42. In the vicinity of the mouth of the second blind hole 37 in the widened end portion of the membrane filter plate 5 a circular recess 43 is formed in the housing block 17. A second sealing ring 44 is located at the edge of the recess 43 for air tight sealing of the junction between the membrane filter plate 5 and the housing block 17.

When no force other than the restoring force of the compressible spring 28 via the head 32 of the positioning screw 21 acts on the piston 20, the valve surrounding the piston 20 is open. In this configuration the compression compartment 24 is connected by the second transverse duct 36, the second blind hole 37, the recess 43, the connecting passage 23, the first circumferential groove 22 and the axially extending piston grooves 34 with the outer atmosphere. This open configuration of the piston 20 is illustrated in FIG. 3.

The relief device 16 for rapid relief of the gaseous medium in the compression compartment 24 includes besides the spacing bolt 21 a stop piece 45 for the adjacent spacing bolt 21 located in the head piece 1 of the filter press. The stop piece 45 has a justifying screw 46 for exact adjustment of the final position of the adjacent spacing bolt 21. Each spacing bolt 21 has an axially adjustable justifying screw 47 for adjustment of the length of the spacing bolt 21. A counterweight 49 pivotable about an axis 48 is mounted on the press plate 4. The counterweight 49 has two curved contacting surfaces 50 and 51 of which the one contacting surface 50 engages the flat head 32 of the positioning screw 31 and the other contacting surface 51 engages the head of the justifying screw 47.

FIG. 3 shows the assembled membrane filter plates 5 in which the hydraulic device 3 for pressing them together is still not effective. The thicknesses $d_{o1} \ldots d_{on}$ of the membrane filter plates 5 and the widths $b_{o1} \ldots b_{o(n-1)}$ of the gaps between the neighboring filter plates 5 are illustrated in FIGS. 2 and 3. The edge region of the filter cloth 41 shown only in FIG. 5 is located in the gaps. The total thickness of the unloaded stack formed by the membrane filter plates 5 and the filter clothes is indicated at $D_d$.

The justifying screw 46 of the stop piece 45 and the extent or length of the individual spacing bolts 21 are adjusted by the justifying screws 47 so that the counterweight 49 is located in the position shown in FIG. 3 with spacing bolts 21 pushed on each other. Thus only the restoring force of the compressible spring 28 of the housing block 17 adjacent the counterweight 49 acts on the counterweight 49 and all the valves are open. If subsequently by operation of the hydraulic device 3 for pressing together the membrane filter plates 5 the press plate 4 moves to the left in regard to FIG. 3 about an amount $D_d$ of the elastic compressibility of the membrane filter plates 5 and the filter cloth 41 the counterweight 49 is pivoted in the counterclockwise direction by the spacing bolts 21 pushing on each other.

Because the arm of the counterweight 49 which engages the head of the justifying screw 47 of the spacing bolt 21 is shorter than the arm of the counterweight 49 which engages the flat head 32 of the positioning screw 31 of the piston 20 the extent which the piston 20 is moved to the left is larger than the relative displacement of the spacing bolt 21 to the right by a distance D.

By pivoting the counterweight 49 the pistons 20 are pressed on each other and pushed into the closed position as is shown in FIG. 2. During this displacement the inner ends of the axial piston grooves 34 are pushed left until they are left of the first sealing rings 25. Because of that the first circumferential groove 22 is closed to the axial piston groove 34 and the connection between the compression compartment 24 and the free atmosphere is broken. When the above described valves are closed a pressure can build up in the compression compartment 24 by which an unshown filter cake found between the filter clothes 41 of two adjacent membrane filter plates can be pressed out additionally.

For operation of the above described filter press it is understandably assumed that the force exerted by the hydraulic device on the press plate 4 is certainly greater than the sum of the forces which occurs by pressing the filter cake and to build up the pressure in the compression compartment 24 so that during the individual pressing process the above described valves remain closed.

Then after the pressing process the feed of the pressurizing medium through the feed channel formed by the transverse duct 35 is interrupted and the hydraulic device 3 exerts a removing force on the press plate 4, the counterweight 49 is pivoted in a clockwise direction which causes the pistons 20 in the housing blocks 17 to move to the right in regard to FIG. 2 into the open position because of the action of the restoring force of the compressible spring 28 before the force exerted by the hydraulic device 3 on the press plate 4 exceeds a certain value. That allows the medium under pressure in the compression compartment 24 standing under pressure to be decompressed quickly according to a predetermined program whereby uncontrollable and thus dangerous decompression events are avoided.

Understandably a variety of examples or embodiments are conceivable in which the stop piece 45 is located on the press plate 4 and the counterweight 49 is found on the head piece 1 of the filter press.

Also an example of the member filter plate 5 is also possible in which the pistons 20 and the spacing bolts 21 are located in passages in the widened end portion or frame portion 14. The example shown in FIGS. 1 to 5 is particularly considered for subsequent equipping of existing membrane filter plates. That is also true for two additional examples which are shown in detail in FIGS. 6 to 11 where only the housing block 17 is reproduced.

Figure 6:
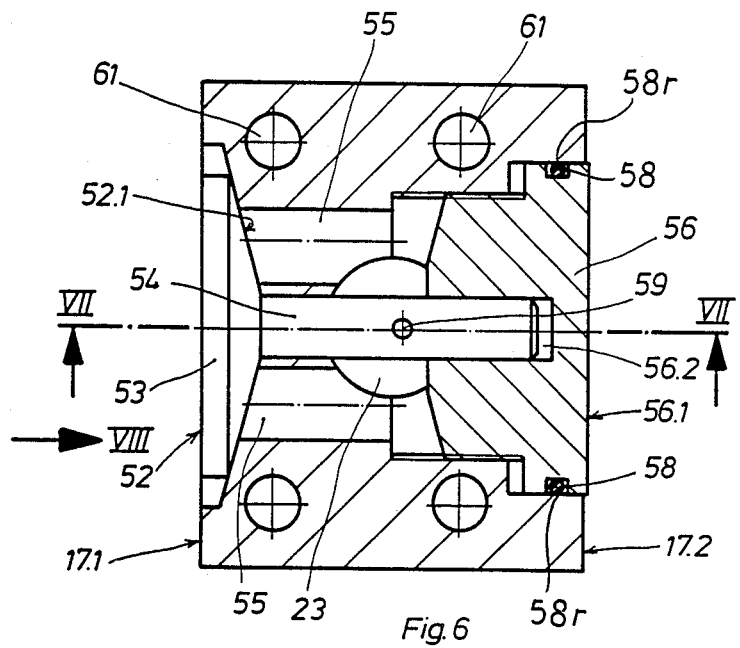
FIG. 6 is a cross sectional view of an additional example of a housing block according to our invention corresponding to that of FIG. 3.
Figure 7:
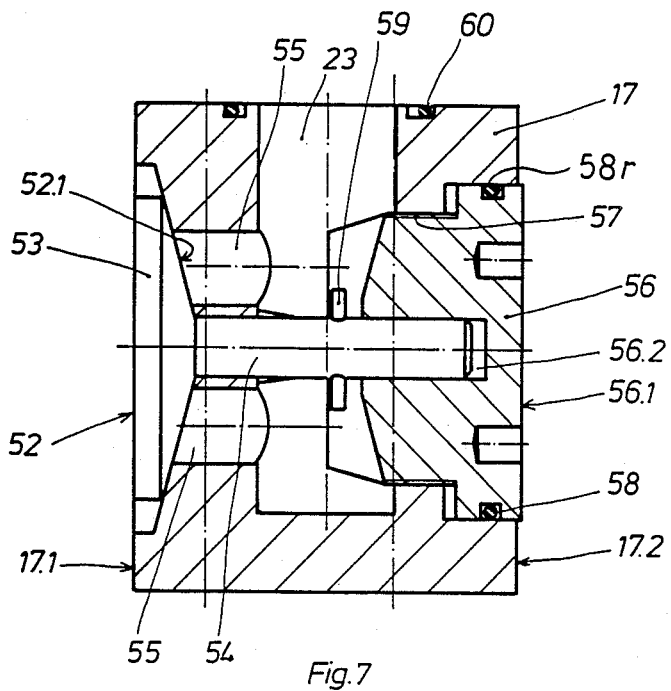
FIG. 7 is a cross sectional view through the object of FIG. 6 taken along the section line VII—VII of FIG. 6.
Figure 8:
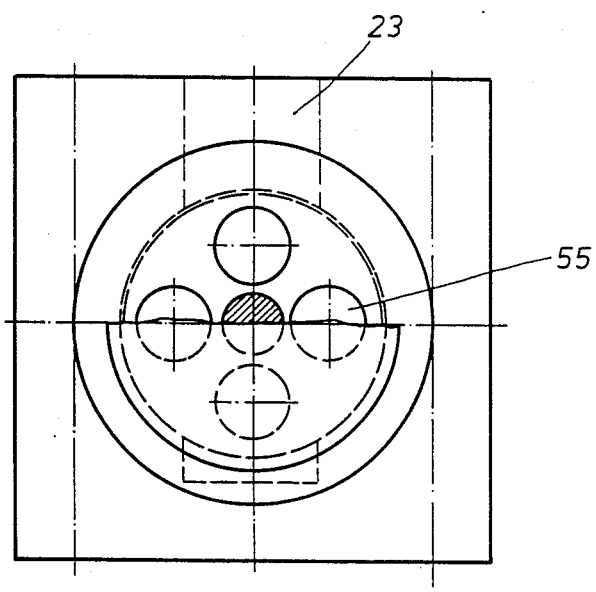
FIG. 8 is a front view of the object of FIG. 6 in the direction of the arrow VIII of FIG. 6.
Figure 9:
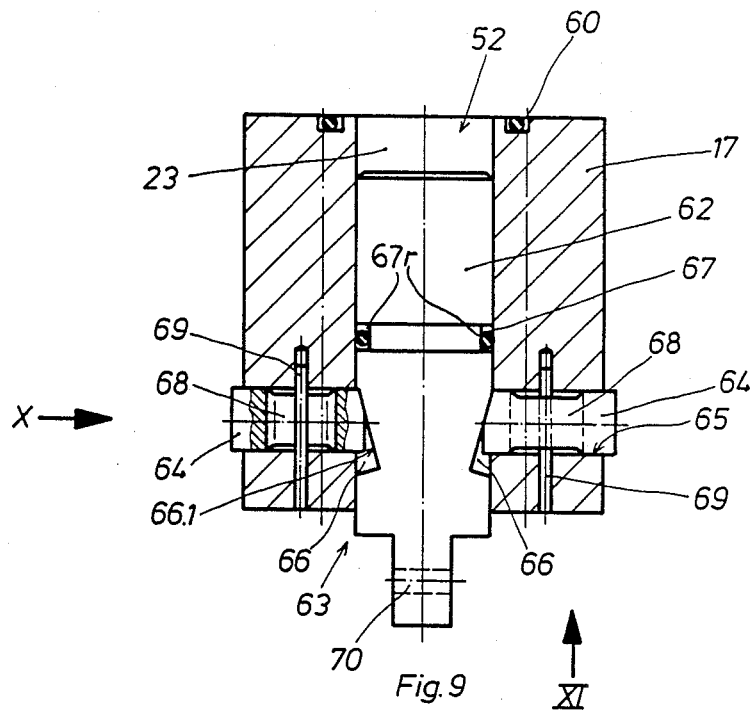
FIG. 9 is a cross sectional view similar to that of FIG. 7 through another example of the housing block of FIG. 6.
Figure 10:
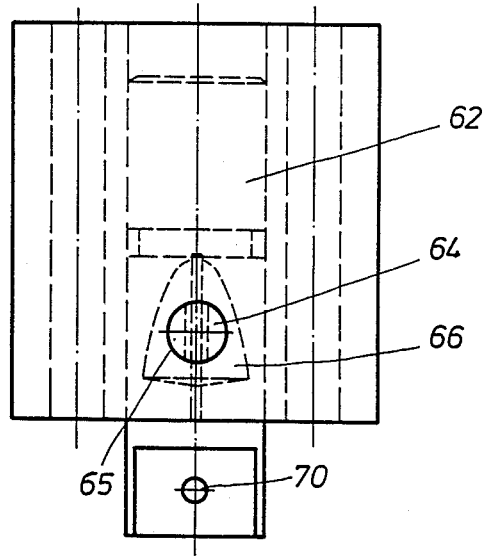
FIG. 10 is side elevational view of the object shown in FIG. 9 as seen in the direction of the arrow X thereof.
Figure 11:
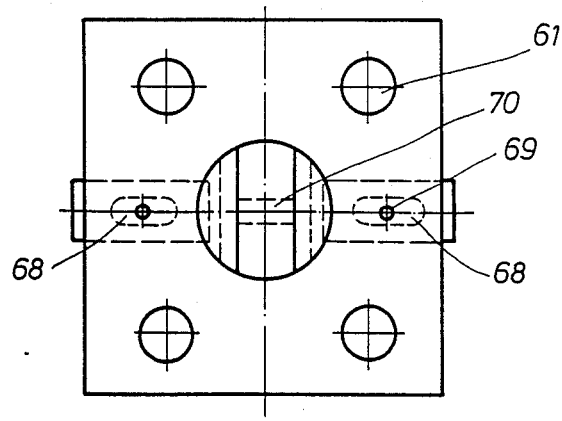
FIG. 11 is a front elevational view of the object shown in FIG. 9 as seen in the direction of the arrow XI thereof.

In the example according to FIGS. 6 to 8 likewise each membrane filter plate 5 has a valve 52 located in a housing block 17 whose valve disk 53 is mounted on a piston 54 slidable axially in the closing direction of the filter press. In the closed state the valve 52 with its front side facing away from the sealing surface 52.1 closes approximately flush with the one lateral surface 17.1 of the housing block 17. The width of the housing block 17 in the direction of the valve displacement corresponds to the thickness of the membrane filter plate 5. Four axial passages 55 extending substantially in the axial direction of the piston 54 open on the surface of the valve seat. These axial passages 55 are connected with a passage 23 extending transversely to the piston 54 and this passage 23 connects the axial passages 55 with the compartment 24 between the membranes 39,40 of the membrane filter plates 5.

A spacing bolt 56 movable and securable in the axial direction of the piston 54 is provided opposite the valve disk 53 on the other lateral surface 17.2 of the housing block 17. The exterior positioning surface 56.1 of the spacing bolt 56 contacts the valve disk 53 of the adjacent membrane filter plate 5 and holds this valve 52 closed under the press pressure of the filter press. The spacing bolt 56 is provided with an exterior thread 57 on its outer surface for its axial displacement which engages in a corresponding interior threading in the housing block 17. Further the spacing bolt 56 has a circular groove 58 on its outer surface for a third sealing ring 58r sealing against the housing block 17. To bound the displacement of the piston 54 and/or to prevent its dropping from the housing block, the piston 54 is provided with a displacement limiting pin 59 positioned in a passage extending transverse to its axis.

The spacing bolt 56 is provided with an axial receiving passage 56.2 for the piston 54 on its end facing away from the adjusting surface 56.1. It acts as a guide for the end of the piston 54. The sealing surface 52.1 of the valve disk 53 has a frustoconical shape whereby an automatic centering of the sealing surface 52.1 on the valve seat when pressure is applied to the filter press. The housing block 17 put in this example on the membrane filter plate 5 is sealed by an additional fourth sealing ring 60 against the membrane filter plate 5. The passages 61 are provided for attachment in a known way.

As has already been described, the individual relief valves 52 are held closed by the limiting spacing bolts 56 as long as the filter press remains under pressure. If however a sudden drop of closing pressure occurs during operation as long as the filter chamber remains under pressure the valve disk 53 lifts under press pressure from its valve seat and provides for a rapid decompression of the filter chamber or compartment.

An additional example allowing an especially rapid depressurization is shown in FIGS. 9 to 11 in which again every member filter plate 5 has a valve 52 located in an edge side connected housing block 17. Here the valve is formed by a substantially cylindrical stopper 62 which is guided axially slidable in a connecting passage 23 extending through the housing block 17. The connecting passage 23 extends substantially parallel to the plane of the membranes 39, 40. The one end of the connecting passage 23 is connected again with the compartment 24 between the membranes 39, 40 of the membrane filter plate 5 while its other end at 63 opens directly into the surroundings.

On both sides of the stopper 62 spacing bolts 64 are located in guide ducts 65 intersecting the connecting passage 23 centrally and at right angles. These spacing bolts 64 engage in wedge-shaped cavities 66 of the stopper 62 and specifically against the wedge surfaces 66.1. The front surface of the spacing bolts 64 contacting the stopper 62 has wedge sloped sides fitting the wedge cavity so that a wear free displacement of the stopper 62 by the spacing bolt 64 is guaranteed.

As long as the membrane filter plate 5 remains under closing pressure of the filter press the stopper 62 acted on by the press pressure from the inside of the membrane filter plates 5 is prevented from exiting from the connecting passage 23 by the spacing bolts 64. If the closing pressure relaxes so that the stopper 62 can by its wedge surfaces 66.1 shift the spacing bolts 64 to the front side of the housing block 17, the stopper 62, as soon as the spacing bolts 64 completely exit from the cross section of the connection passage 23, is forced out under press pressure from the connecting passage 23.

The stopper 62 is provided with a circular groove 67 for a fifth sealing ring sealing 67r the stopper 62 against the housing block 17 on its outer surface between its end facing the membrane filter plate 5 and the wedge cavity 66. Further the spacing bolts 64 have a slot extending in the axial direction through which a displacement limiting pin 69 fixed in the housing block 17 engages to fix their displacement and to keep them from rotation. Finally the stopper is provided with a connecting member 70 on its end protruding from the housing block 17 for a securing chain to prevent the stopper 62 from dropping in the troublesome situation after issuing from the connecting passage 23 and thereby causing damage or injury.

By "valve" in the relief device we mean to include here the piston 2 mounted in the first passage 18 in the housing block 17 which essentially functions as the piston cylinder, the axial grooves 34 in the piston 20 and the valve spring 28 and any associated means for controlling these components.

The "means for closing or opening the valve" includes by definition the spacing bolts 21, counterweight 49, the justifying bolts 47 and 46 and the stop piece 45.

Figure 12:
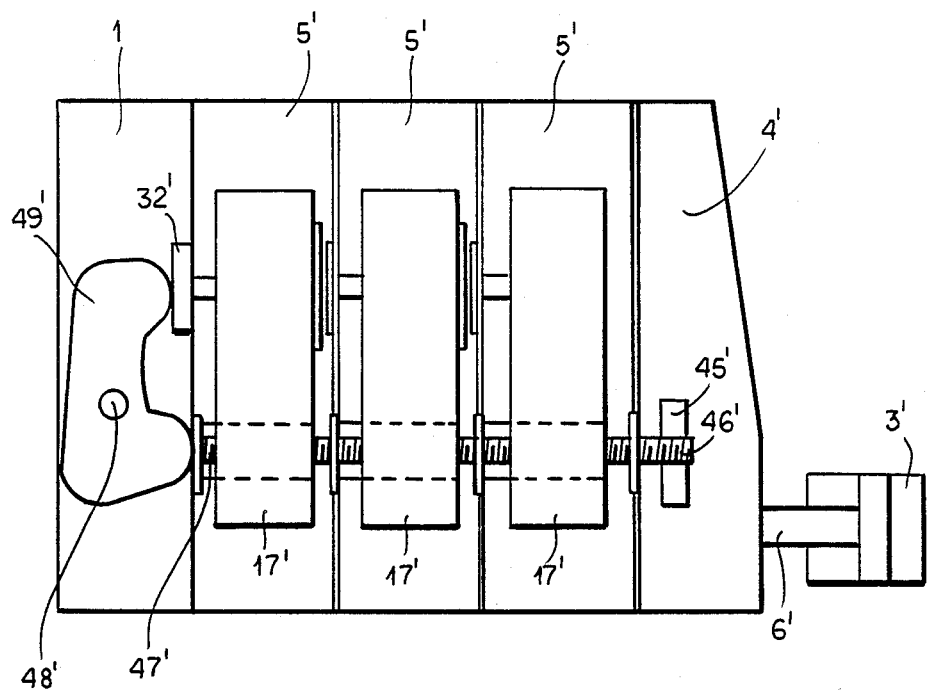
FIG. 12 is a partially broken-away side elevational view, partially cross sectional view similar to FIG. 3 of a portion of another example of a filter press according to our invention with a different relief device.

Another example of the relief device according to our invention is shown in FIG. 12. Similar or equivalent parts in this example have the same reference number as in the previous example except that in all cases it is primed. In this example in contrast to that of FIGS. 1 to 3 the stop piece 45' is mounted in the press plate 4' and the counterweight 49' is mounted in the head piece 1'. Otherwise its structure and operation is identical with the example of FIGS. 1 to 5.

We claim:

1. In a filter press comprising a plurality of membrane filter plates which are positioned slidably between a locally fixed head piece and a press plate, a hydraulic device for pressing together said membrane filter plates between said head piece and said press plate and a device for feeding a pressurized gaseous medium under pressure to a plurality of pressurizable compartments defined by membranes of said membrane filter plates, the improvement comprising a relief device to rapidly decompress said pressurized gaseous medium in said membrane filter plates having a plurality of valves, each formed in a respective one of said membrane filter plates, said relief device having means including at least one actuator element engageable with valve members of the respective valves for automatically closing said valves when said membrane filter plates are pressed together and for automatically opening said valves when said outer pressure on said membrane filter plates by said hydraulic device relaxes.

2. The improvement defined in claim 1 wherein each membrane filter plate is associated with one of said valves, each of said valves has a piston slidable in a first passage and a piston spring acting on said piston, a first circumferential groove extending radially exteriorly being present in said first passage which is connected by a connecting passage with a compression chamber between said membranes of said membrane filter plate and at least one axially extending piston groove being present in said piston by which said pressurized gaseous medium flows to the surrounding atmosphere when said valve is opened.

3. The improvement defined in claim 2 wherein additional circumferential grooves for receiving respective first sealing rings are formed on each side of said first circumferential groove, each of said pistons has an axial first blind hole, an interior thread is formed at least in the end portion of said first blind hole facing away from said axially extending piston groove, a positioning screw with a flat head is screwed in said first blind hole for adjustment of the extent or length of said piston and said flat head acts as a support for said piston spring.

4. The improvement defined in claim 3 wherein said means for opening and closing said valves include a plurality of spacing bolts, a counterweight pivotable about an axis and a stop piece.

5. The improvement defined in claim 4 wherein each of said spacing bolts is slidably mounted in a second passage and has an interior thread in which a justifying screw for adjustment of the length or extent of said spacing bolts is screwed.

6. The improvement defined in claim 4 wherein said pistons are arranged in a row along a first linear path, said spacing bolts and said stop pieces are positioned along a second linear path parallel to said first linear path, said axis about which said counterweight is pivotable is positioned either in said head piece or said press plate and said stop piece in said press plate or in said head piece.

7. The improvement defined in claim 5 wherein each of said pistons is slidably mounted in said first passage in one of a plurality of housing blocks and each of said spacing bolts is slidably mounted in said second passage in one of said plurality of said housing blocks and each of said housing blocks is mounted on one of the small sides and in a corner region of each of said membrane filter plates.

8. The improvement defined in claim 7 wherein a circular recess is formed in the surface of said housing block contacting on said small side of said membrane filter plate, a second sealing ring is positioned in the edge region of said recess, the interior of said recess is connected on the one side with said first circumferential groove by at least one connecting passage in said housing block and on the other side with said compression chamber between said membranes of said membrane filter plate by second blind hole in the edge region of the associated one of said membrane filter plates.

9. The improvement defined in claim 1 wherein each of said membrane filter plates has one of said valves mounted in a housing block closed on one edge, said valve having a valve disk mounted on a piston axially slidable in the closing direction of said filter press and which in the closed state closes with a front surface of said valve disk facing away from a sealing surface of said valve disk approximately flush with one of the lateral surfaces of said housing block, while at least one axial passage extending substantially in the axial direction of said piston opens onto the surface of the valve seat of said valve which is connected with a connecting passage extending transversely to said piston and by said connecting passage with a compression chamber between said membranes of said membrane filter plate and a spacing bolt is provided movable and fixable in the axial direction of said piston on the other lateral surface of said housing block opposite said valve disk, the outer positioning surface of said spacing bolt contacting on said valve disk of the adjacent one of said membrane filter plates and holding said valve closed under the press pressure of said filter press.

10. The improvement defined in claim 9 wherein said spacing bolt is provided on an outer surface thereof with an exterior thread for axial positioning which engages in a corresponding interior thread in said housing block and on said outer surface a circular groove for one of said spacing bolts has a third sealing ring sealing against said housing block.

11. The improvement defined in claim 9 wherein said piston is provided with a displacement limiting pin oriented transverse to the axis of said piston limiting the displacement of said piston.

12. The improvement defined in claim 9 wherein said spacing bolt is provided on a side facing said positioning surface with an axial receiving passage for said piston.

13. The improvement defined in claim 9 wherein said sealing surface of said valve disk has a frustoconical shape.

14. The improvement defined in claim 1 wherein each membrane filter plate has a respective one of said valves mounted in a housing block closed on one edge which is formed by substantially cylindrical stopper which is guided axially slidable in a connecting passage extending through said housing block which extends substantially parallel to the plane of said membrane and whose one end is connected with a compression chamber between said membranes and said membrane filter plate while the other end opens into the surroundings and a spacing bolt is mounted on each side of said stopper which engages in a guide duct intersecting centrally and at right angles said connecting passage and engages in a wedge shaped cavity of said stopper so that the wedge surface opens on the side facing said membrane filter plate in the outer surface of said stopper and the front surfaces of said spacing bolts contacting on said stopper have inclined sides fitting said wedge shaped cavity.

15. The improvement defined in claim 14 wherein the outer surface of said stopper between the end of said stopper facing said membrane filter plate and said wedge shaped cavity is provided with a circular groove for a fifth sealing ring sealing said stopper against said housing block.

16. The improvement defined in claim 14 wherein each of said spacing bolts has a slot extending in the axial direction through which a displacement limiting pin fixed in said housing block engages for limiting the displacement of said spacing bolt and maintaining said spacing bolt in position nonrotatably.

17. The improvement defined in claim 14 wherein said spacing bolt has a somewhat greater length than the portion of said spacing bolt received in said guide duct.

18. The improvement defined in claim 14 wherein said stopper is provided with a connecting member for a securing chain on an end protruding from said housing block.

19. A filter press comprising:
a fixed head piece;
a press plate positioned opposite said head piece movable by a connected hydraulic device;
a plurality of membrane filter plates each having at least one membrane positioned slidably between said locally fixed head piece and said press plate and being pressed together by said hydraulic device;
a device for feeding a pressurized gaseous medium under pressure to said membrane of said membrane filter plates; and
a relief device to rapidly decompress said pressurized gaseous medium in said membrane filter plates comprising a plurality of valves, each of said valves being mounted in a housing block attached to an edge of said membrane filter plates and being connected with each of said valves on adjacent ones of said housing blocks on adjacent associated ones of said membrane filter plates, each of said valves comprising:
a piston slidable in a first passage of said housing block, said first passage being provided with a first circumferential groove extending radially exteriorly being present in said first passage which is connected by a connecting passage with a compression chamber between said membranes of said membrane filter plates and said piston being provided with at least one axially extending piston groove by which said pressurized gaseous medium flows to the surrounding atmosphere when said valve is opened and also said first passage being provided with additional circumferential grooves for receipt of respective first sealing rings on each side of said first circumferential groove, each of said pistons having an axial blind hole having an interior thread at least in the end portion of said blind hole facing away from said axially extending piston groove, a positioning screw with a flat head is screwed in said blind hole for adjustment of the extent or length of said piston and a piston spring acting on said piston with said flat head acting as a support for said piston spring, a circular recess being present in the surface of said housing block contacting on the adjacent side of said membrane filter plate, a second sealing ring being positioned in the edge region of said recess, the interior of said recess being connected on the one side with said first circumferential groove by at least one connecting passage in said housing block and on the other side with said compression compartment between said membranes of said membrane filter plate by a blind hole in the edge region of the associated one of said membrane filter plates;
a plurality of spacing bolts slidably mounted in said housing blocks in a second passage provided with an interior thread in which a justifying screw for adjustment of the length or extent of said spacing bolts is screwed, a counterweight pivotably about an axis and a stop piece which together comprise a means for automatically opening and closing said valves, said pistons being arranged in a first row along a first linear path, said spacing bolts and said stop piece are positioned along a second linear path parallel to said first linear path, said axis about which said counterweight and said stop piece are pivotable on said press plate.

20. A filter press comprising:
a plurality of membrane filter plates which are positioned slidably between a locally fixed head plate and a press plate;
a hydraulic device for pressing together said membrane filter plates between said head piece and said press plate;
a device for feeding a pressurized gaseous medium under pressure to a plurality of membranes of said membrane filter plates; and
a relief device to rapidly decompress said pressurized gaseous medium in said membrane filter plates having a plurality of valves, said relief device having means for automatically closing said valves when said membrane filter plates are pressed together and for automatically opening said valves when an outer pressure on said membrane filter plates applied by said hydraulic device relaxes, each of said membrane filter plates having one of said valves mounted in a housing block closed on one edge, said valve having a valve disk mounted on a piston axially slidably in the closing direction of said filter press and which in the closed state closes with a front surface of said valve disk facing away from a sealing surface of said valve disk approximately flush with one of the lateral surfaces of said housing block, while at least one axial passage extending substantially in the axial direction of said piston opens onto the surface of the valve seat of said valve which is connected with a connecting passage extending transversely to said piston and by said connecting passage with a compression chamber between said membranes of said membrane filter plate and a spacing bolt is provided movable and fixable in the axial direction of said piston on the other lateral surface of said housing block opposite said valve disk, the outer positioning surface of said spacing bolt contacting on said valve disk of the adjacent one of said membrane filter plates and holding said valve closed under the press pressure of said filter press, said spacing bolt is provided on an outer surface thereof with an exterior thread for axial positioning which engages in a corresponding interior thread in said housing block and on said outer surface a circular groove for one of said spacing bolts has a third sealing ring sealing against said housing block and said piston is provided with a displacement limiting pin orienting transverse to the axis of said piston limiting the displacement of said piston.

* * * * *